United States Patent
Yu et al.

(10) Patent No.: US 11,321,178 B1
(45) Date of Patent: May 3, 2022

(54) AUTOMATED RECOVERY FROM RAID DOUBLE FAILURE

(71) Applicant: EMC IP HOLDING COMPANY LLC, Hopkinton, MA (US)

(72) Inventors: Rong Yu, West Roxbury, MA (US); Peng Wu, Westborough, MA (US); Shao Hu, Westborough, MA (US); Lixin Pang, Needham, MA (US)

(73) Assignee: Dell Products, L. P., Hopkinton, MA (US)

( * ) Notice: Subject to any disclaimer, the term of this patent is extended or adjusted under 35 U.S.C. 154(b) by 0 days.

(21) Appl. No.: 17/361,401

(22) Filed: Jun. 29, 2021

(51) Int. Cl.
| G06F 11/10 | (2006.01) |
| G06F 11/07 | (2006.01) |
| G06F 11/14 | (2006.01) |

(52) U.S. Cl.
CPC ...... *G06F 11/1096* (2013.01); *G06F 11/0772* (2013.01); *G06F 11/1461* (2013.01); *G06F 11/1469* (2013.01)

(58) Field of Classification Search
CPC ............. G06F 11/1096; G06F 11/0772; G06F 11/1461; G06F 11/1469
See application file for complete search history.

(56) References Cited

U.S. PATENT DOCUMENTS

| 8,285,758 | B1* | 10/2012 | Bono | G06F 16/122 707/822 |
| 8,990,520 | B1* | 3/2015 | Tang | G06F 12/1072 711/154 |
| 9,804,939 | B1* | 10/2017 | Bono | G06F 3/0689 |
| 10,073,621 | B1* | 9/2018 | Foley | G06F 11/1076 |
| 10,365,983 | B1* | 7/2019 | Foley | G06F 11/2094 |
| 11,144,396 | B1* | 10/2021 | Hua | G06F 11/2094 |
| 11,226,860 | B1* | 1/2022 | Baptist | G06F 11/1092 |
| 11,256,447 | B1* | 2/2022 | Pang | G06F 3/067 |
| 2008/0256292 | A1* | 10/2008 | Flynn | G06F 13/426 711/E12.04 |
| 2012/0266011 | A1* | 10/2012 | Storer | G06F 11/1092 714/1 |
| 2015/0363254 | A1* | 12/2015 | Satoyama | G06F 11/0727 714/57 |
| 2017/0063397 | A1* | 3/2017 | Richardson | G06F 16/2365 |
| 2017/0270018 | A1* | 9/2017 | Xiao | G06F 3/0644 |
| 2018/0081768 | A1* | 3/2018 | Maheshwar | G06F 11/2094 |
| 2018/0314427 | A1* | 11/2018 | Dalmatov | G06F 3/0659 |
| 2019/0227872 | A1* | 7/2019 | Dalmatov | G06F 11/2094 |

(Continued)

*Primary Examiner* — Matthew M Kim
*Assistant Examiner* — Indranil Chowdhury
(74) *Attorney, Agent, or Firm* — Anderson Gorecki LLP

(57) ABSTRACT

Occurrence of a RAID double failure in a slice of a RAID protection group (failed slice) renders data stored in the back-end tracks of the failed slice vulnerable to loss. When a RAID double failure is detected, a new slice is added to the RAID protection group. Front-end tracks that map to the good back-end tracks of the failed slice are moved from the back-end tracks of the failed slice to the back-end tracks of the newly added slice. Any front-end tracks that mapped to the bad back-end tracks of the failed slice are made to be write pending and written to corresponding back-end tracks of the newly added slice. Front-end tracks that map to the bad back-end tracks may be made to be write-pending in connection with a host write operation, by reading the front-end tracks from a local backup, or from a remote backup location.

20 Claims, 10 Drawing Sheets

(56) References Cited

U.S. PATENT DOCUMENTS

| | | | | |
|---|---|---|---|---|
| 2020/0133776 A1* | 4/2020 | Dong | ................... | G06F 11/1088 |
| 2020/0320002 A1* | 10/2020 | Doddaiah | .............. | G06N 3/063 |
| 2021/0034267 A1* | 2/2021 | Kucherov | ........... | G06F 11/1088 |
| 2022/0035718 A1* | 2/2022 | Sridhara | .............. | G06F 11/1088 |
| 2022/0066868 A1* | 3/2022 | Betz | ................... | G06F 11/2094 |

* cited by examiner

AUTOMATED RECOVERY FROM RAID DOUBLE FAILURE

FIELD

This disclosure relates to computing systems and related devices and methods, and, more particularly, to automated recovery from RAID double failure.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Occurrence of a RAID double failure in a slice of a RAID protection group (failed slice) renders data stored in the back-end tracks of the failed slice vulnerable to loss. According to some embodiments, when a RAID double failure is detected, a new slice is added to the RAID protection group. Front-end tracks that map to the good back-end tracks of the failed slice are moved from the back-end tracks of the failed slice to the back-end tracks of the newly added slice. Any front-end tracks that mapped to the bad back-end tracks of the failed slice are made to be write pending and written to corresponding back-end tracks of the newly added slice. Front-end tracks that map to the bad back-end tracks may be made to be write-pending in connection with a host write operation, by reading the front-end tracks from a local backup, or by reading the front-end tracks from a remote backup location.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
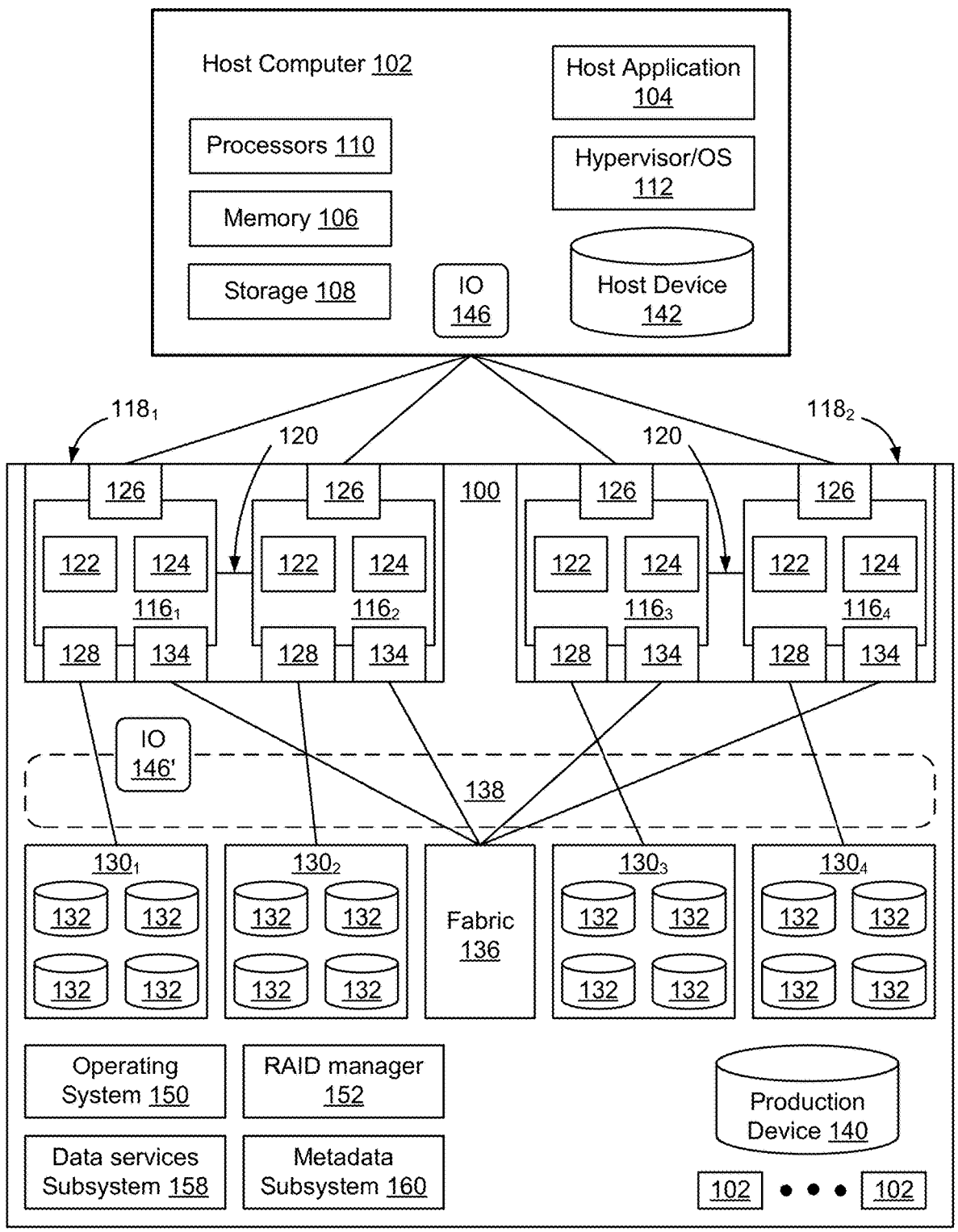
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Figure 2:
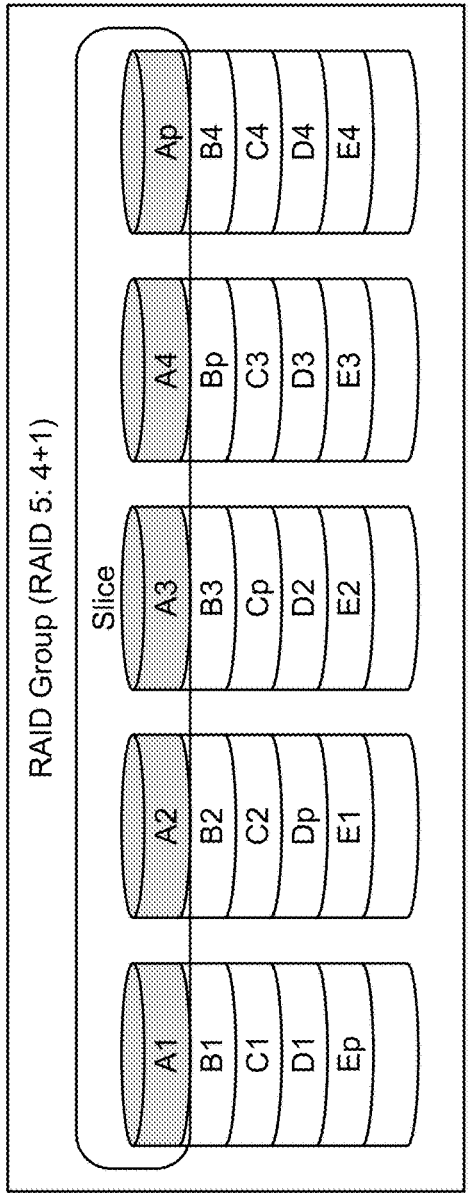
FIG. 2 is a functional block diagram of an example RAID protection group, organized using RAID 5: 4+1, according to some embodiments.
Figure 3:
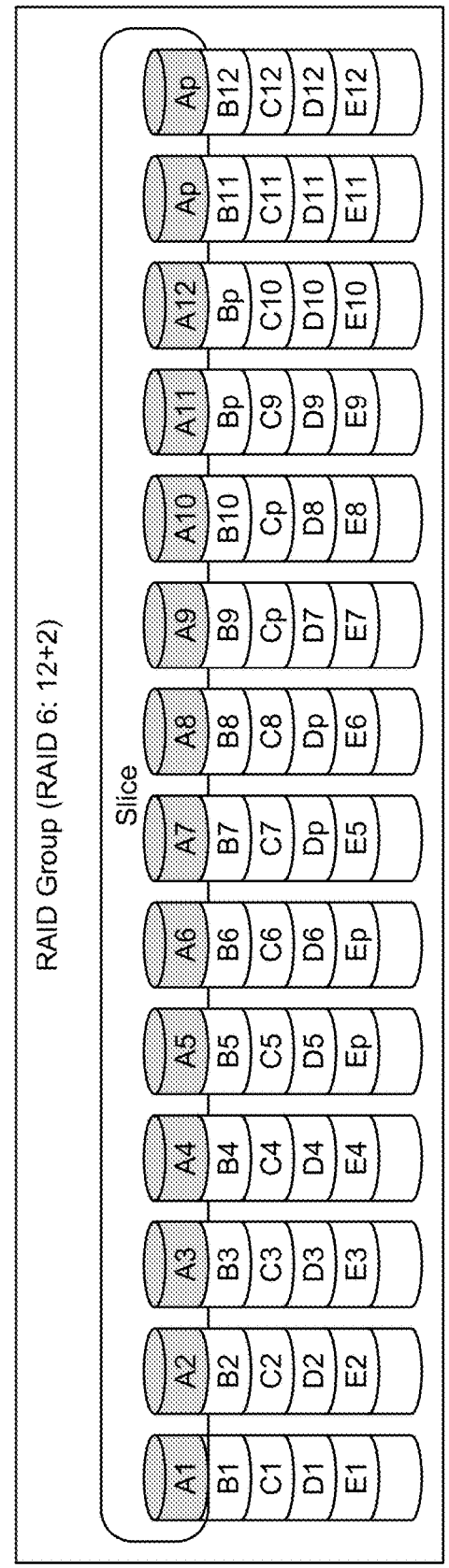
FIG. 3 is a functional block diagram of an example RAID protection group, organized using RAID 6: 12+2, according to some embodiments.

Data on managed drives may be protected using Redundant Array of Independent Disk (RAID) protection groups. FIGS. 2 and 3 show two example RAID protection groups, in which FIG. 2 shows a RAID protection group implemented using RAID 5, with 4 data tracks and 1 parity track in each slice of the RAID protection group. RAID 5 has distributed parity, in which parity for the various slices is distributed between the various drives selected to implement the RAID protection group. FIG. 3 shows a RAID protection group implemented using RAID 6, which has dual parity that is similarly distributed between the various drives selected to implement the RAID protection group. The RAID 6 protection group in FIG. 3 is shown as a protection group in which there are 12 data tracks and 2 parity tracks in each slice of the RAID protection group. There are many ways of organizing RAID 5 and RAID 6 protection groups, and the implementations shown in FIGS. 2 and 3 are merely two examples.

RAID 5 has back-end tracks arranged in block-level slices with distributed parity. A RAID 5 protection group is able to recover from a single drive failure or from a single failure in a back-end track of a particular slice. Two or more failures in a RAID 5 protection group, e.g. two back-end track failures in a given slice, will result in a double failure. When a double failure occurs, the remaining data in the affected slice is not protected, meaning that if a subsequent failure occurs the subsequent failure will result in data being lost.

RAID 6 is similar to RAID 5, with tracks arranged in block-level slices with distributed parity. RAID 6 extends RAID 5 by including two parity blocks distributed within each slice. By including two parity blocks, a RAID 6 protection group can continue to execute read and write requests in the presence of any two concurrent failures. With RAID 6, three or more failures in a RAID 6 protection group, e.g. three back-end track failures in a given slice, will result in a double failure. When a double failure occurs, the remaining data in the affected slice is not protected, meaning that if a subsequent failure occurs the subsequent failure will result in data being lost. Although FIG. 3 shows a particular example of RAID 6, there are many ways to organize the data within the RAID protection group and, as used herein, the term RAID 6 is used to refer to any form of RAID that can continue to execute read and write requests to all of the RAID array's virtual back-end tracks in the presence of any two concurrent back-end track failures.

As used herein, the term "double failure" is used to refer to any failure that would prevent the RAID protection group from performing data recovery. While two examples will be provided in which the double failure involves the failure of two back-end tracks of a RAID 5 protection group, and the failure of three back-end tracks of a RAID 6 protection group, it should be understood that other RAID failures may occur which would result in the RAID protection group being unable to recover data due to the configuration of the RAID protection group. The term "double failure" is intended to cover all such failure scenarios.

As shown in FIG. 1, in some embodiments the storage system 100 has an operating system 150, and one or more system applications, such as a RAID manager 152, data services subsystem 158, and metadata subsystem 160. The RAID manager 152 is responsible for creating RAID groups from managed storage resources 132. The metadata subsystem is used to maintain metadata mapping front-end tracks, e.g. tracks of host device 142, to back-end tracks of production device 140. Where the production device 140 is protected using a RAID protection group, the metadata subsystem 160 correlates front-end track identifiers with back-end tracks of the associated RAID protection group. A data services subsystem 158 is provided to manage tracks of data stored on the storage system 100 and may be used, for example, to move tracks of data between managed storage resources 132.

Figure 4:
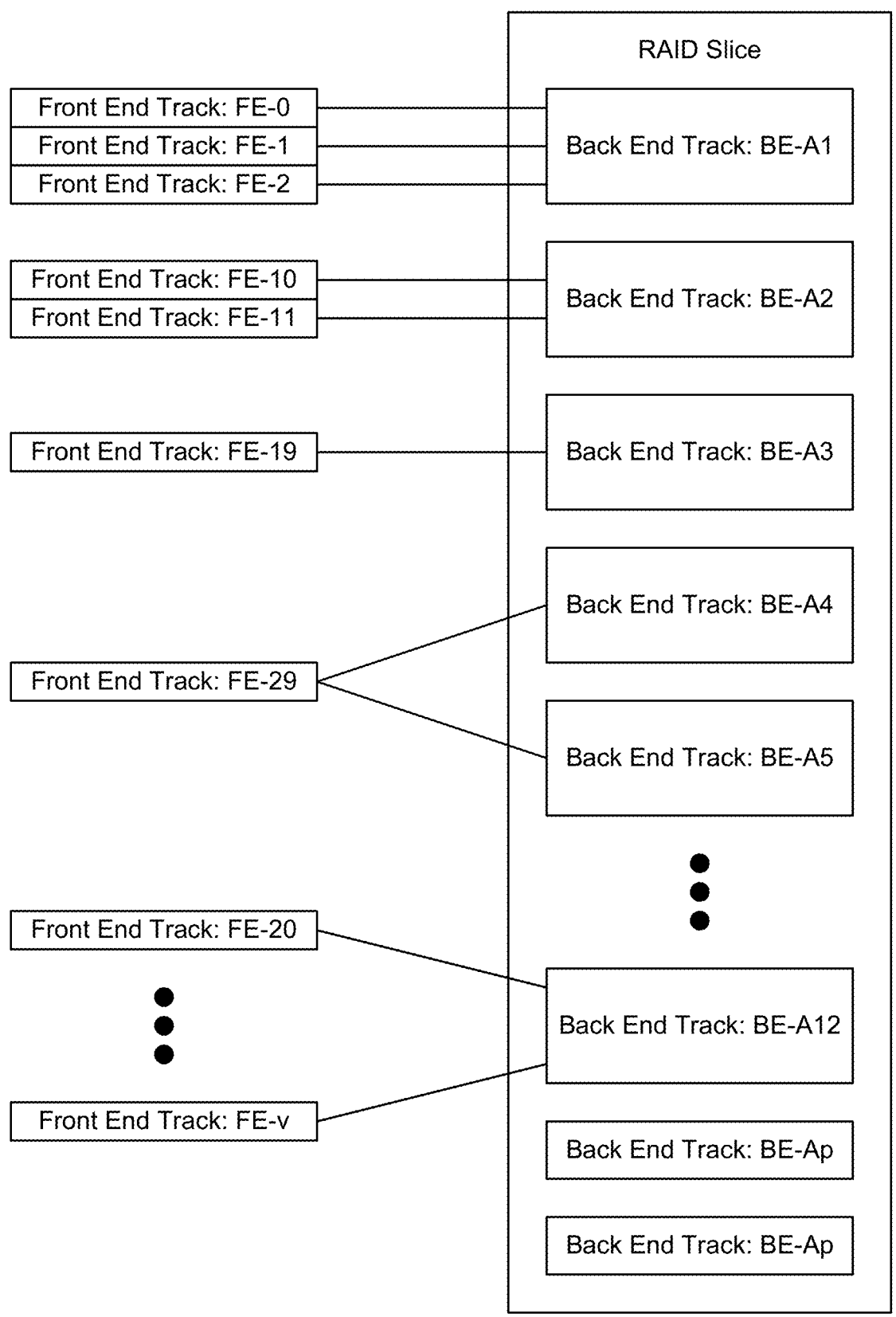
FIG. 4 is a functional block diagram of an example slice of a RAID protection group, showing an example mapping between front-end tracks and back-end tracks of the slice of the RAID protection group, according to some embodiments.

FIG. 4 is a functional block diagram of an example slice of a RAID group, showing an example mapping between front-end tracks and back-end tracks of the RAID slice, according to some embodiments. As shown in FIG. 4, there are many possible mappings between front-end tracks and back-end tracks. For example, in FIG. 4 three front-end tracks FE-0, FE-1, and FE-2 map to the same back-end track BE-A1. Two front-end tracks FE-10 and FE-11 map to back-end track BE-A2. A single front-end track FE-19 is mapped to back-end track BE-A3. And a single front-end track FE-29 is mapped to two back-end tracks BE-A4 and BE-A5. The number of front-end tracks that are mapped to a particular back-end track will depend on the size of the front-end track, the size of the back-end track, whether a data reduction technology such as compression or deduplication is being used, and many other features of the storage system.

If a double failure occurs, such as if back-end track BE-A1, BE-A2, and BE-A3 were to all fail, the double failure will affect all front-end tracks that are mapped to the RAID slice. In particular, the front-end tracks that are mapped to back-end tracks BE-A4 through BE-A12 would not be RAID protected, such that if a subsequent failure were to occur within the slice the subsequent failure would result in additional data loss. Further, because of the double failure, the duplicative parity data BE-Ap cannot be used to recover the data associated with the front-end tracks that are mapped to the failed back-end tracks BE-A1, BE-A2, and BE-A3. This means that the other back-end tracks are currently not RAID protected so, if any of the other back-end tracks has a single drive issue, its data can't be rebuilt since there are already too many failures in the slice.

In an environment where there are multiple back-end tracks in a given RAID protection slice, e.g. in a RAID 6:12+2 configuration, and where multiple front-end tracks are mapped to a given back-end track, recovering from a double failure can be a difficult and time consuming process.

In some embodiments, when a RAID double failure is detected, a new slice is added to the RAID protection group. Front-end tracks that map to the good back-end tracks of the failed slice are moved from the back-end tracks of the failed slice to the back-end tracks of the newly added slice. Any front-end tracks that mapped to the bad back-end tracks of the failed slice are made to be write pending and written to corresponding back-end tracks of the newly added slice. Front-end tracks that map to the bad back-end tracks may be made to be write-pending in connection with a host write operation, by reading the front-end tracks from a local backup, or from a remote backup location.

Figure 5:
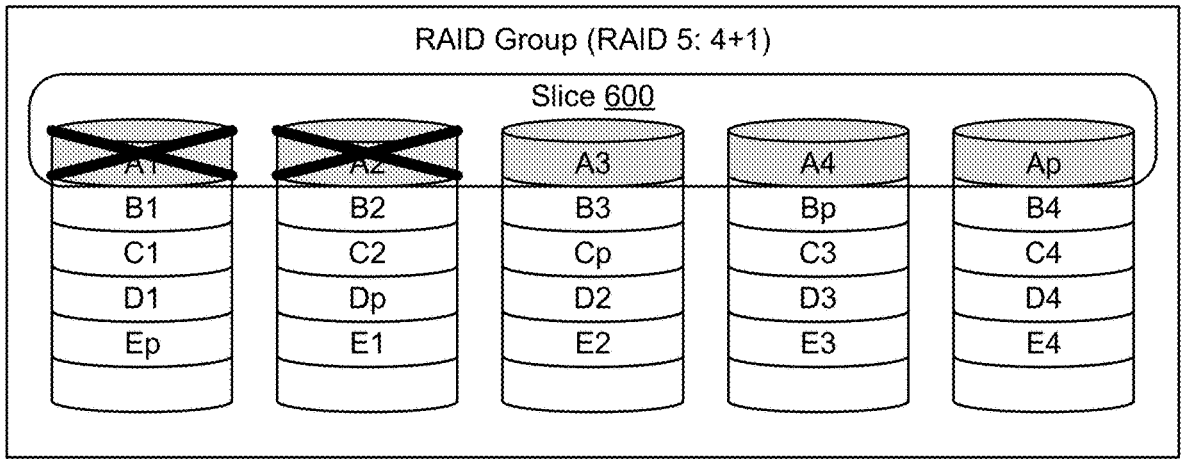
FIG. 5 is a functional block diagram of an example RAID protection group, organized using RAID 5: 4+1, in which a RAID double failure has occurred (two failed tracks) on a particular slice of the RAID protection group, according to some embodiments.

FIG. 5 is a functional block diagram of an example RAID protection group, organized using RAID 5: 4+1, in which a RAID double failure has occurred (two failed tracks) on a particular slice of the RAID protection group, according to some embodiments.

Figure 6:
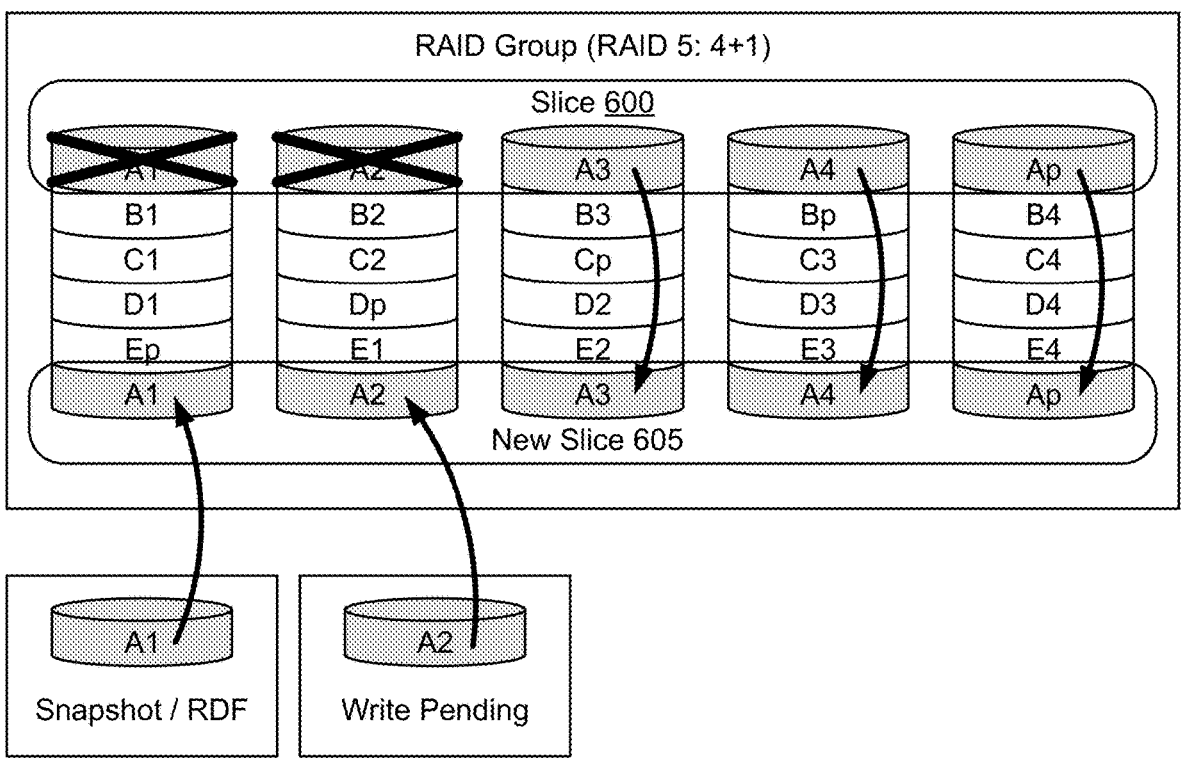
FIG. 6 is a functional block diagram of the example RAID protection group of FIG. 5, illustrating automated recovery from the RAID double failure, according to some embodiments.

FIG. 6 is a functional block diagram of the example RAID protection group of FIG. 5, illustrating automated recovery from the RAID double failure, according to some embodiments. As shown in FIG. 6, when a RAID double failure is detected in a slice 600, a new slice 605 is added to the RAID protection group. The previous bad slice 600 is marked as read only, and any front-end tracks that map to back-end tracks that are still good in the bad slice 600 are moved to corresponding back-end tracks of the new, good slice 605. In the illustrated example, front-end tracks and parity data from the back-end tracks A3, A4, and Ap of slice 600 are shown as being moved to corresponding new back-end tracks A3, A4, and Ap of the new, good slice 605.

Any back-end tracks that are detected to be Data Unavailable Tracks (DUT) are marked as bad, and all front-end tracks that map to those tracks will be made to be write pending, such that data is able to be restored to the back-end tracks. In the illustrated example, tracks A1 and A2 are shown as the DUT tracks and, as such, any front-end tracks that map to those back-end tracks will be made to be write pending to enable the front-end tracks to be written to those back-end tracks of the new slice 605.

In some instances, a write operation from the host is received and, when the write is to be destaged to the back-end track, the back-end track is determined to be DUT. In this instance, when the new good slice 605 is added to the RAID protection group, the write pending from the host is able to be written to a corresponding back-end track of the new good slice 605. If the write-pending is a partial write to the front-end track, the rest of the data of the front-end track is retrieved from a backup location, such as a snapshot copy, and the write pending is merged with the previous data to make the write pending a full write. Other front-end tracks that are not currently write pending from the host are retrieved from a backup location, such as a local snapshot copy or a remote backup copy, and written to corresponding back-end tracks of the new slice.

Figure 7:
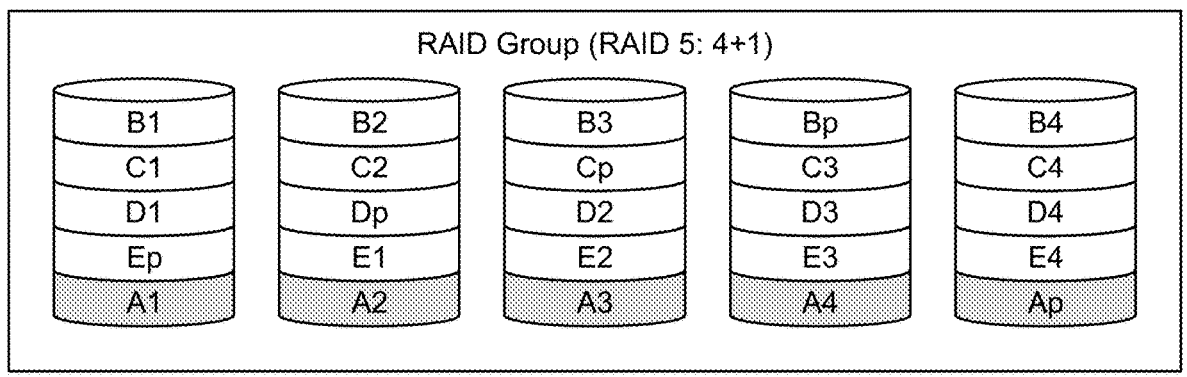
FIG. 7 is a functional block diagram of the example RAID protection group of FIG. 5, after recovery from the RAID double failure, according to some embodiments.

FIG. 7 is a functional block diagram of the example RAID protection group of FIG. 5, after recovery from the RAID double failure, according to some embodiments. As shown in FIG. 7, once all of the front-end tracks have been moved from the bad slice 600 to the new good slice 605, and restored by making the front-end tracks write pending, the back-end tracks of the previous bad slice 600 are marked as reclaimable. After being reclaimed, if none of the drives are bad, the whole slice 600 is eligible for reuse.

Figure 8:
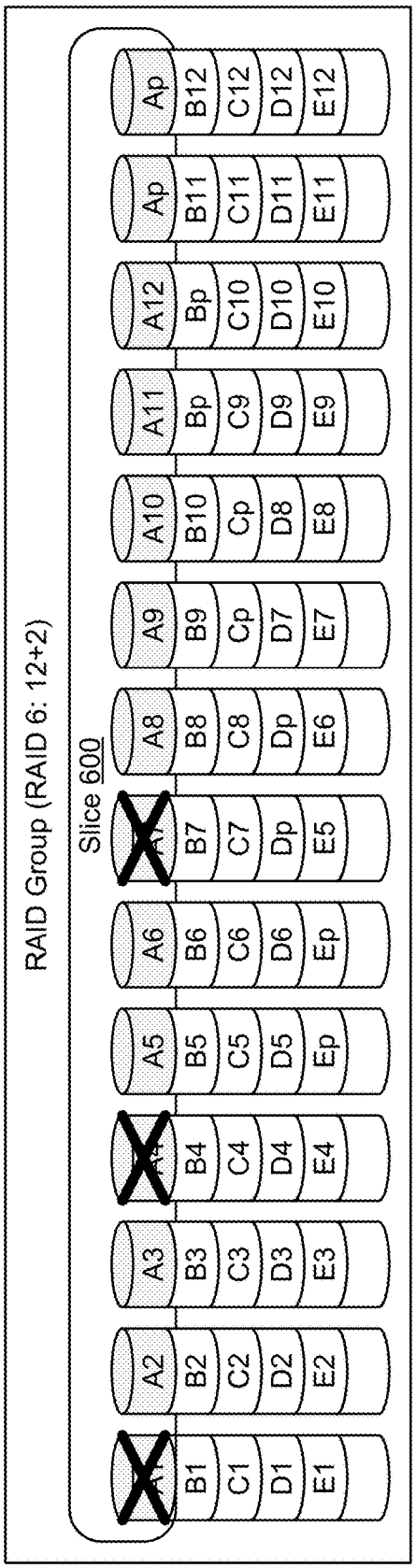
FIG. 8 is a functional block diagram of an example RAID protection group, organized using RAID 6: 12+2, in which a RAID double failure has occurred (three failed tracks) on a particular slice of the RAID protection group, according to some embodiments.

FIG. 8 is a functional block diagram of an example RAID protection group, organized using RAID 6: 12+2, in which a RAID double failure has occurred (three failed tracks) on a particular slice of the RAID protection group, according to some embodiments. Although only three failed tracks are shown in FIG. 8, the double failure can involve three or more failures in a given slice of a RAID 6 protection group. As noted herein, the term "double failure" does not refer to the number of back-end tracks that are DUT, but rather refers to a RAID protection group that has experience sufficient failures to prevent the RAID protection group from protecting against further loss of data.

Figure 9:
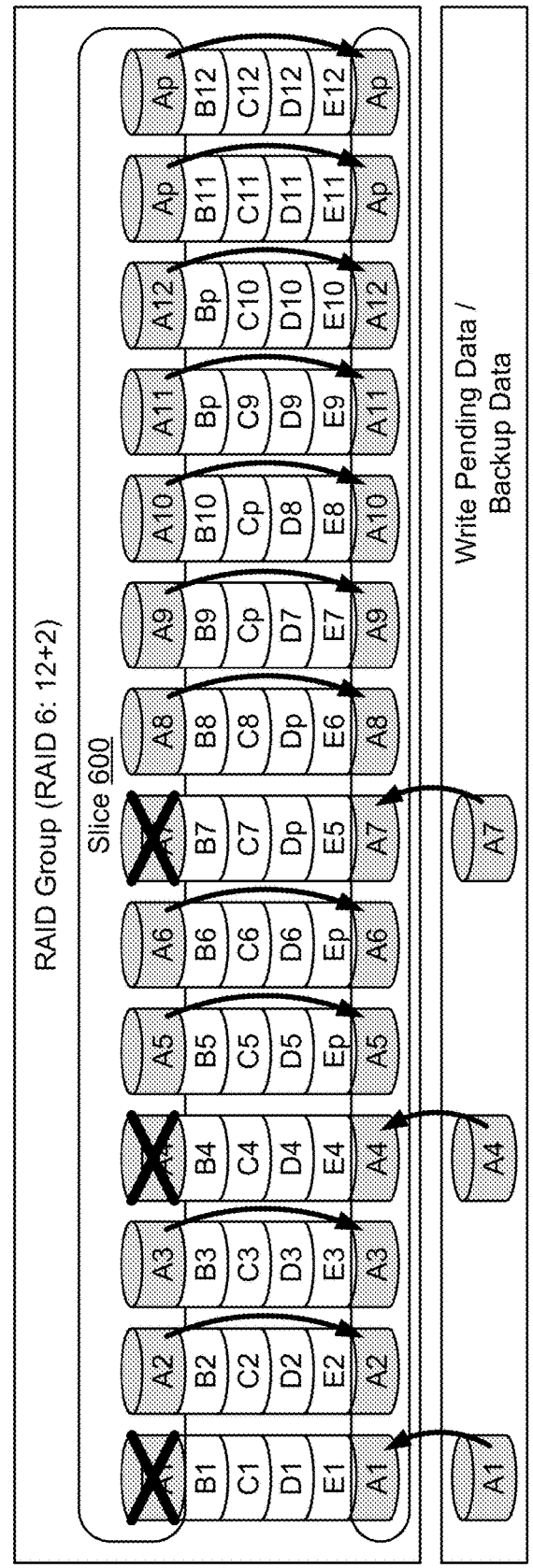
FIG. 9 is a functional block diagram of the example RAID protection group of FIG. 8, illustrating automated recovery from the RAID double failure, according to some embodiments.

FIG. 9 is a functional block diagram of the example RAID protection group of FIG. 8, illustrating automated recovery from the RAID double failure, according to some embodiments. As shown in FIG. 9, when a RAID double failure is detected in a bad slice 600, the bad slice 600 is marked as read-only to prevent additional data from being written to the back-end tracks of the bad slice 600. A new good slice 605 is added to the RAID protection group and all front-end tracks that are mapped to good back-end tracks of the bad slice 600 are moved to corresponding back-end tracks of the new good slice 605. In FIG. 9, for example, back-end tracks A2-A3, A5-A6, and A8-Ap are all determined to be good and the data from those back-end tracks is moved to corresponding tracks in the new good slice 605.

Any back-end tracks that are detected to be Data Unavailable Tracks (DUT) are marked as bad, and all front-end tracks that map to those tracks will be made to be write pending, such that data is able to be restored to the back-end tracks. In the illustrated example, tracks A1, A4, and A7 are shown as the DUT tracks and, as such, any front-end tracks that map to those back-end tracks will be made to be write pending to enable the front-end tracks to be written to those back-end tracks of the new slice 605. The back-end tracks A1, A4, and A7 of the new good slice 605 can be made to be write pending by reading data from the corresponding tracks from a backup location, such as a local backup (snapshot) or remote mirrored backup. If one or more of the front-end tracks is write pending due to a host write, the data of the host write is merged with corresponding data from a backup copy of the front-end track and written to the selected back-end track of the new, good slice 605.

Figure 10:
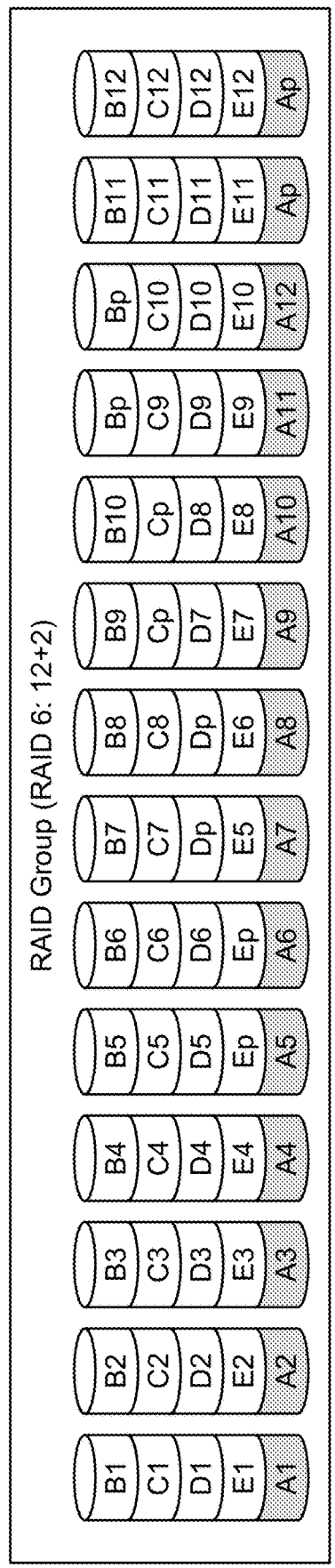
FIG. 10 is a functional block diagram of the example RAID protection group of FIG. 8, after recovery from the RAID double failure, according to some embodiments.

FIG. 10 is a functional block diagram of the example RAID protection group of FIG. 8, after recovery from the RAID double failure, according to some embodiments. As shown in FIG. 10, once all of the front-end tracks have been moved from the bad slice 600 to the new good slice 605, and restored by making the front-end tracks write pending, the back-end tracks of the previous bad slice 600 are marked as reclaimable. After being reclaimed, if none of the drives are bad, the whole slice 600 is eligible for reuse.

Figure 11:
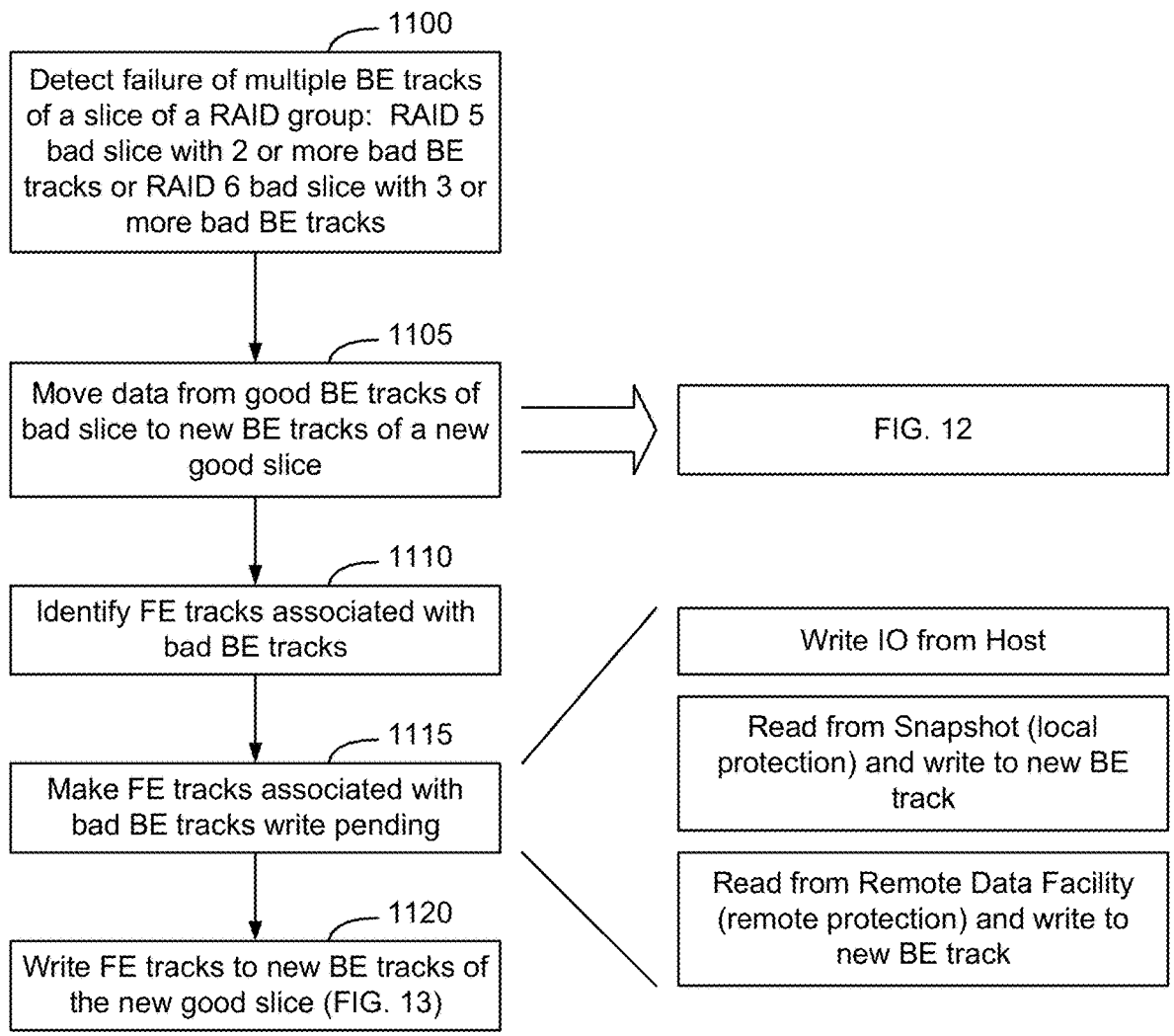
FIGS. 11-13 are flow charts of a method of automated recovery from a RAID double failure, according to some embodiments.
Figure 12:
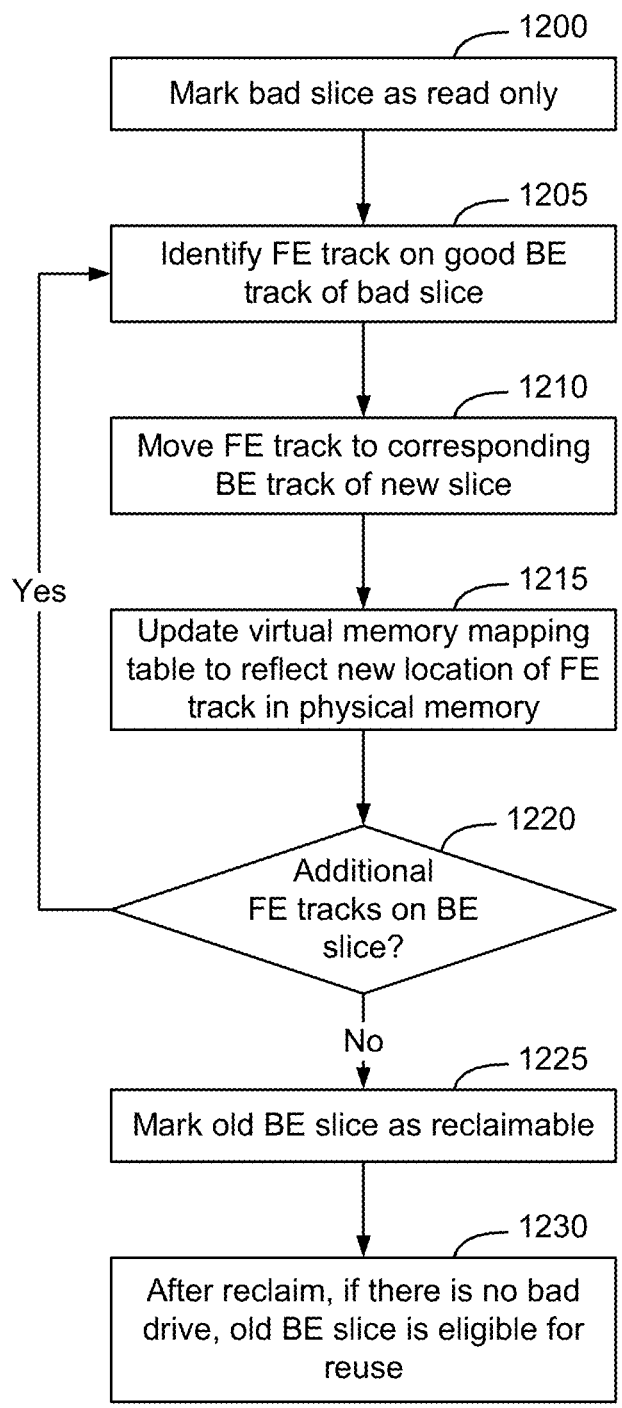
Figure 13:
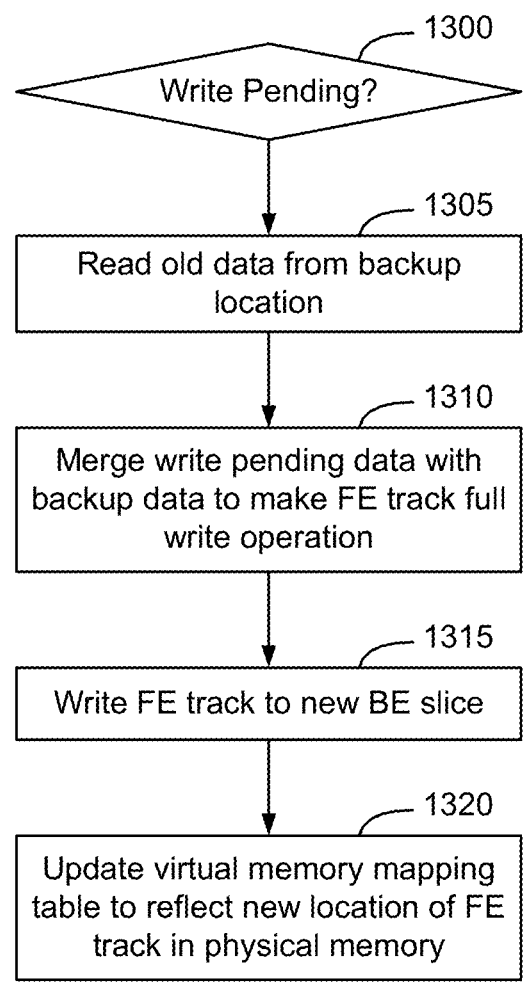

FIGS. 11-13 are flow charts of a method of automated recovery from a RAID double failure, according to some embodiments. The method shown in FIGS. 11-13 may be implemented by a RAID manager 152 (see FIG. 1) automatically upon detection of a double fault in a slice of a RAID protection group. As shown in FIG. 11, when a double failure is detected, which affects multiple back-end tracks of a particular RAID protection group (block 1100), the RAID manager 152 will start an automated process of recovering from the RAID double fault.

To initiate the process, the RAID manager 152 will add a new good slice to the RAID protection group and move front-end tracks from the good Back-End (BE) tracks of the bad slice to corresponding tracks of the newly added good slice (block 1105). Additional details of how front-end tracks may be identified and moved from the good tracks of the bad slice to the tracks of the new slice are provided in connection with FIG. 12. Once the front-end tracks are moved to the corresponding tracks of the new, good slice, the mapping of the front-end tracks to the old back-end tracks is reclaimed. Movement of data from the old back-end tracks of the bad slice to the new back-end tracks of the new, good slice may be implemented using data movement APIs, or another similar implementation.

The RAID manager 152 also identifies front-end tracks associated with the bad back-end tracks (block 1110) and makes the corresponding front-end tracks write pending to enable those front-end tracks to be written to the back-end tracks of the new, good slice that correspond to the failed back-end tracks of the old bad slice (block 1115). Making the front-end tracks write pending can be implemented by the RAID manager 152 in connection with a write IO from the host, by reading the front-end tracks from a snapshot (local protection copy), or by reading the front-end tracks from a remote mirror backup version of the front-end tracks. The RAID manager 152 then writes the front-end tracks to the new back-end tracks of the new, good slice to complete the recovery (block 1120).

FIG. 12 is a flow chart of an example process of moving data from good back-end tracks of the bad slice to corresponding new back-end tracks of the new, good slice. As shown in FIG. 12, when a double failure is detected in a slice of a RAID protection group, the bad slice is marked as read-only (block 1200). This prevents additional write operations to any back-end track of the bad slice.

The RAID manager 152 identifies a Front-End (FE) track on one of the back-end tracks of the bad slice that is not experiencing failure (block 1205). The RAID manager 152 moves the front-end track from the back-end track of the bad slice to a corresponding back-end track of the new, good slice (block 1210). The virtual memory mapping table is then updated to reflect the new location of the front-end track in physical memory (block 1215).

A determination is then made if there are additional front-end tracks that map to one or more of the good back-end tracks of the bad slice (block 1220). If there are additional front-end tracks that map to one or more of the good back-end tracks of the bad slice (a determination of YES at block 1220), the process returns to block 1205 where a subsequent front-end track is selected and moved. In this manner the RAID manager identifies and moves all front-end tracks from the good back-end tracks of the bad slice to corresponding back-end tracks of the new, good slice. Although FIG. 12 shows movement of the front-end tracks serially, multiple front-end tracks may be moved from the good back-end tracks of the bad slice to corresponding back-end tracks of the new, good slice in parallel.

As the front-end tracks are moved from the good back-end tracks of the bad slice to corresponding back-end tracks of the new, good slice, or after all of the front-end tracks have been moved, the old back-end tracks of the bad slice are marked as reclaimable (block 1225). After the back-end tracks have been reclaimed, if there is no bad drive, the old back-end slice is eligible for reuse (block 1230).

FIG. 13 is a functional block diagram of a method of implementing a write operation from a host to a back-end track of a slice of a RAID protection group that is experiencing a double-failure. If a write IO operation is received on a front-end track (block 1300), and it is determined that the write operation is directed to a back-end track on a slice of a RAID protection group that is experiencing failure, the write IO will be made to be a full write operation and written to a corresponding track of a new slice of the RAID protection group. Accordingly, as shown in FIG. 13, to make the write IO a full write, the old data associated with the front-end track will be read from a backup location (block 1305). The write pending data is then merged with the backup data to make the front-end track a full write operation (block 1310). The front-end track is then written to a new back-end track of the new back-end slice (block 1315), and the virtual memory mapping table is updated to reflect the new location of the front-end track in physical memory (block 1320).

By providing a RAID manager 152 that is configured to automatically handle RAID double failures, it is possible to proactively move unprotected data from good back-end tracks of the slice that is experiencing failure to minimize the likelihood of further data loss. Additionally, by automatically rebuilding the back-end tracks that have been identified as data unavailable tracks, by causing all front-end tracks that map to those tracks to become write pending, it is possible to fully restore all front-end tracks to a new slice of the RAID protection group while assuring that all data of the slice is fully protected by the RAID protection group. This enhances the security of the data contained in the managed storage resources 132 of the storage system while minimizing the amount of user intervention required to recover from a double failure in a slice of a RAID protection group.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for automated recovery from a RAID double failure, the computer program including a set of instructions which, when executed by a computer, cause the computer to perform a method comprising the steps of:
   detecting double failure of a first slice of a RAID group, the first slice of the RAID group including a plurality of good back-end tracks and a plurality of bad back-end tracks;
   adding a new second slice to the RAID group, the new second slice having a plurality of second back-end tracks;
   for each good back-end track of the first slice of the RAID group, relocating front-end tracks mapped to the good back-end track to a respective one of the second back-end tracks of the new second slice of the RAID group;
   identifying a set of front-end tracks mapped to the plurality of bad back-end tracks;
   making the front-end tracks write pending; and
   writing the front-end tracks to a respective plurality of second back-end tracks of the new second slice of the RAID group.

2. The non-transitory tangible computer readable storage medium of claim 1, wherein making the front-end tracks write pending comprises, for a particular front-end track associated with a write destage operation, merging previously written data of the write destage operation with write data pending destage, and writing the particular front-end track to one of the second back-end tracks of the new second slice of the RAID group.

3. The non-transitory tangible computer readable storage medium of claim 1, wherein making the front-end tracks write pending comprises, for a particular front-end track, retrieving front-end track data from a local protection data repository and writing the particular front-end track to one of the second back-end tracks of the new second slice of the RAID group.

4. The non-transitory tangible computer readable storage medium of claim 3, wherein the local protection data repository is a snapshot of the front-end track.

5. The non-transitory tangible computer readable storage medium of claim 1, wherein making the front-end tracks write pending comprises, for a particular front-end track, retrieving front-end track data from a remote data facility, and writing the particular front-end track to one of the second back-end tracks of the new second slice of the RAID group.

6. The non-transitory tangible computer readable storage medium of claim 1, wherein multiple front-end tracks map to each of the bad back-end tracks.

7. The non-transitory tangible computer readable storage medium of claim 1, further comprising marking the first slice of the RAID group as read-only after detecting the double failure of the first slice of the RAID group.

8. The non-transitory tangible computer readable storage medium of claim 1, further comprising reclaiming the back-end tracks of the first slice of the RAID group for use in other RAID groups.

9. The non-transitory tangible computer readable storage medium of claim 1, wherein the RAID group is a RAID 5: 4+1, and the double failure of the first slice of the RAID group is a determination that two or more back-end tracks of the first slice are Data Unavailable Tracks (DUTs).

10. The non-transitory tangible computer readable storage medium of claim 1, wherein the RAID group is a RAID 6: 12+2, and the double failure of the first slice of the RAID group is a determination that three or more back-end tracks of the first slice are Data Unavailable Tracks (DUTs).

11. A method of automated recovery from a RAID double failure, comprising the steps of:
   detecting double failure of a first slice of a RAID group, the first slice of the RAID group including a plurality of good back-end tracks and a plurality of bad back-end tracks;
   adding a new second slice to the RAID group, the new second slice having a plurality of second back-end tracks;
   for each good back-end track of the first slice of the RAID group, relocating front-end tracks mapped to the good back-end track to a respective one of the second back-end tracks of the new second slice of the RAID group;
   identifying a set of front-end tracks mapped to the plurality of bad back-end tracks;
   making the front-end tracks write pending; and
   writing the front-end tracks to a respective plurality of second back-end tracks of the new second slice of the RAID group.

12. The method of claim 11, wherein making the front-end tracks write pending comprises, for a particular front-end track associated with a write destage operation, merging previously written data of the write destage operation with write data pending destage, and writing the particular front-end track to one of the second back-end tracks of the new second slice of the RAID group.

13. The method of claim 11, wherein making the front-end tracks write pending comprises, for a particular front-end track, retrieving front-end track data from a local protection data repository and writing the particular front-end track to one of the second back-end tracks of the new second slice of the RAID group.

14. The method of claim 13, wherein the local protection data repository is a snapshot of the front-end track.

15. The method of claim 11, wherein making the front-end tracks write pending comprises, for a particular front-end track, retrieving front-end track data from a remote data facility, and writing the particular front-end track to one of the second back-end tracks of the new second slice of the RAID group.

16. The method of claim 11, wherein multiple front-end tracks map to each of the bad back-end tracks.

17. The method of claim 11, further comprising marking the first slice of the RAID group as read-only after detecting the double failure of the first slice of the RAID group.

18. The method of claim 11, further comprising reclaiming the back-end tracks of the first slice of the RAID group for use in other RAID groups.

19. The method of claim 11, wherein the RAID group is a RAID 5: 4+1, and the double failure of the first slice of the RAID group is a determination that two or more back-end tracks of the first slice are Data Unavailable Tracks (DUTs).

20. The method of claim 11, wherein the RAID group is a RAID 6: 12+2, and the double failure of the first slice of the RAID group is a determination that three or more back-end tracks of the first slice are Data Unavailable Tracks (DUTs).

* * * * *